US009305590B2

(12) United States Patent
Miller

(10) Patent No.: US 9,305,590 B2
(45) Date of Patent: Apr. 5, 2016

(54) PREVENT DATA STORAGE DEVICE CIRCUITRY SWAP

(75) Inventor: Michael H. Miller, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 2553 days.

(21) Appl. No.: 11/873,136

(22) Filed: Oct. 16, 2007

(65) Prior Publication Data

US 2009/0100273 A1 Apr. 16, 2009

(51) Int. Cl.
| | |
|---|---|
| G06F 21/00 | (2013.01) |
| G11B 20/00 | (2006.01) |
| G06F 21/10 | (2013.01) |
| G11B 20/18 | (2006.01) |
| H04N 5/913 | (2006.01) |

(52) U.S. Cl.
CPC .......... *G11B 20/00086* (2013.01); *G06F 21/10* (2013.01); *G11B 20/005* (2013.01); *G11B 20/0021* (2013.01); *G11B 20/00166* (2013.01); *G11B 20/00231* (2013.01); *G11B 20/00246* (2013.01); *G11B 20/00492* (2013.01); *G11B 20/00543* (2013.01); *G11B 20/1816* (2013.01); *H04N 5/913* (2013.01); *G11B 2220/20* (2013.01); *G11B 2220/61* (2013.01); *H04N 2005/91364* (2013.01)

(58) Field of Classification Search
CPC .............. G06F 21/00; G11B 20/00086; G11B 20/00166; G11B 20/0021; G11B 20/00231; G11B 20/00246; G11B 20/005; G11B 20/00543; G11B 20/1816; G11B 20/00492; G11B 2220/20; G11B 2220/61; H04N 2005/91364; H04N 5/913

USPC ......................................................... 713/193
See application file for complete search history.

(56) References Cited

U.S. PATENT DOCUMENTS

| | | | |
|---|---|---|---|
| 4,698,672 A | 10/1987 | Chen et al. | |
| 4,706,121 A | 11/1987 | Young | |
| 4,734,764 A | 3/1988 | Pocock et al. | |
| 4,751,578 A | 6/1988 | Reiter et al. | |

(Continued)

OTHER PUBLICATIONS

Cobb, M., 'Secure USB best practices: Choosing USB hardware encryption', Apr. 7, 2011, TechTarget, entire document, http://www.computerweekly.com/tip/Secure-USB-best-practices-Choosing-USB-hardware-encryption.*

(Continued)

*Primary Examiner* — Christopher Brown
*Assistant Examiner* — Ronald Baum
(74) *Attorney, Agent, or Firm* — HolzerIPLaw, PC

(57) ABSTRACT

A device comprises a data storage media storing data content and a digital signature. At least a portion of the digital signature is encrypted on the data storage media. The device also includes a removable control circuitry including a unique key. If the unique key corresponds to the encrypted portion of the digital signature, the removable control circuitry allows access to the data content. If the unique key does not correspond to the encrypted portion of the digital signature, the removable control circuitry prevents access to the data content. Embodiments of the invention may be useful to prevent a user from accessing the data content without the original control circuitry used to write the data content. For example, embodiments of the invention may prevent a user from using a different control circuitry that would readily allow unauthorized copying and distribution of the data content.

20 Claims, 6 Drawing Sheets

(56) References Cited

U.S. PATENT DOCUMENTS

| | | |
|---|---|---|
| 4,792,849 A | 12/1988 | McCalley et al. |
| 4,829,372 A | 5/1989 | McCalley et al. |
| 4,841,309 A | 6/1989 | Burr |
| 4,860,123 A | 8/1989 | McCalley et al. |
| 4,885,775 A | 12/1989 | Lucas |
| 4,905,094 A | 2/1990 | Pocock |
| 4,908,713 A | 3/1990 | Levine |
| 4,941,040 A | 7/1990 | Pocock |
| 4,945,563 A | 7/1990 | Horton et al. |
| 4,963,994 A | 10/1990 | Levine |
| 4,963,995 A | 10/1990 | Lang |
| 4,977,455 A | 12/1990 | Young |
| 4,991,011 A | 2/1991 | Johnson et al. |
| 4,997,011 A | 3/1991 | Dyer et al. |
| 5,010,499 A | 4/1991 | Yee |
| 5,014,125 A | 5/1991 | Pocock et al. |
| 5,038,211 A | 8/1991 | Hallenbeck |
| 5,113,496 A | 5/1992 | McCalley et al. |
| 5,119,188 A | 6/1992 | McCalley et al. |
| 5,121,476 A | 6/1992 | Yee |
| 5,126,998 A | 6/1992 | Stem, Jr. et al. |
| 5,151,789 A | 9/1992 | Young |
| 5,158,155 A | 10/1992 | Domain et al. |
| 5,191,410 A | 3/1993 | McCalley et al. |
| 5,195,092 A | 3/1993 | Wilson et al. |
| 5,208,665 A | 5/1993 | McCalley et al. |
| 5,227,780 A | 7/1993 | Tigwell |
| 5,241,428 A | 8/1993 | Goldwasser et al. |
| 5,253,066 A | 10/1993 | Vogel |
| 5,255,269 A | 10/1993 | Stem, Jr. |
| 5,293,357 A | 3/1994 | Hallenbeck |
| 5,307,173 A | 4/1994 | Yuen et al. |
| 5,335,079 A | 8/1994 | Yuen et al. |
| 5,351,130 A | 9/1994 | Dugan et al. |
| 5,353,121 A | 10/1994 | Young et al. |
| 5,357,276 A | 10/1994 | Banker et al. |
| 5,371,551 A | 12/1994 | Logan et al. |
| 5,382,983 A | 1/1995 | Kwoh et al. |
| 5,392,239 A | 2/1995 | Margulis et al. |
| 5,406,626 A | 4/1995 | Ryan |
| 5,426,756 A | 6/1995 | Shyi et al. |
| 5,475,382 A | 12/1995 | Yuen et al. |
| 5,477,262 A | 12/1995 | Banker et al. |
| 5,479,266 A | 12/1995 | Young et al. |
| 5,479,268 A | 12/1995 | Young et al. |
| 5,479,302 A | 12/1995 | Haines |
| 5,488,409 A | 1/1996 | Yuen et al. |
| 5,499,103 A | 3/1996 | Mankovitz |
| 5,502,694 A | 3/1996 | Kwoh et al. |
| 5,508,815 A | 4/1996 | Levine |
| 5,512,963 A | 4/1996 | Mankovitz |
| 5,513,262 A * | 4/1996 | van Rumpt et al. ............. 380/29 |
| 5,515,173 A | 5/1996 | Mankovitz et al. |
| 5,523,794 A | 6/1996 | Mankovitz et al. |
| 5,524,051 A | 6/1996 | Ryan |
| 5,532,732 A | 7/1996 | Yuen et al. |
| 5,532,754 A | 7/1996 | Young et al. |
| 5,539,391 A | 7/1996 | Yuen |
| 5,539,478 A | 7/1996 | Bertram et al. |
| 5,539,479 A | 7/1996 | Bertram |
| 5,541,738 A | 7/1996 | Mankovitz |
| 5,543,852 A | 8/1996 | Yuen et al. |
| 5,543,929 A | 8/1996 | Mankovitz et al. |
| 5,544,190 A | 8/1996 | Mensz |
| 5,548,340 A | 8/1996 | Bertram |
| 5,550,576 A | 8/1996 | Klosterman |
| 5,552,837 A | 9/1996 | Mankovitz |
| 5,553,123 A | 9/1996 | Chan et al. |
| 5,559,550 A | 9/1996 | Mankovitz |
| 5,560,795 A | 10/1996 | Bruckner et al. |
| 5,566,528 A | 10/1996 | Lee |
| 5,568,272 A | 10/1996 | Levine |
| 5,579,057 A | 11/1996 | Banker et al. |
| 5,581,614 A | 12/1996 | Ng et al. |
| 5,586,865 A | 12/1996 | Yin |
| 5,590,195 A | 12/1996 | Ryan |
| 5,600,711 A | 2/1997 | Yuen |
| 5,600,839 A | 2/1997 | MacDonald |
| 5,602,597 A | 2/1997 | Bertram |
| 5,604,544 A | 2/1997 | Bertram |
| 5,606,374 A | 2/1997 | Bertram |
| 5,619,274 A | 4/1997 | Roop et al. |
| 5,619,383 A | 4/1997 | Ngai |
| 5,621,579 A | 4/1997 | Yuen |
| 5,623,634 A | 4/1997 | Liu |
| 5,640,484 A | 6/1997 | Mankovitz |
| 5,652,630 A | 7/1997 | Bertram et al. |
| 5,657,414 A | 8/1997 | Lett et al. |
| 5,659,367 A | 8/1997 | Yuen |
| 5,673,089 A | 9/1997 | Yuen et al. |
| 5,684,525 A | 11/1997 | Klosterman |
| 5,684,674 A | 11/1997 | Yin |
| 5,701,383 A | 12/1997 | Russo et al. |
| 5,703,760 A | 12/1997 | Zhu |
| 5,706,145 A | 1/1998 | Hindman et al. |
| 5,715,133 A | 2/1998 | Harrington et al. |
| 5,719,998 A | 2/1998 | Ku et al. |
| 5,721,815 A | 2/1998 | Ottensen et al. |
| 5,721,878 A | 2/1998 | Ottensen et al. |
| 5,727,060 A | 3/1998 | Young |
| 5,734,786 A | 3/1998 | Mankovitz |
| 5,734,823 A | 3/1998 | Saigh |
| 5,734,891 A | 3/1998 | Saigh |
| 5,748,126 A | 5/1998 | Ma et al. |
| 5,751,806 A | 5/1998 | Ryan |
| 5,751,883 A | 5/1998 | Ottensen et al. |
| 5,754,651 A | 5/1998 | Blatter et al. |
| 5,757,417 A | 5/1998 | Aras et al. |
| 5,774,186 A | 6/1998 | Brodsky et al. |
| 5,777,276 A | 7/1998 | Zhu |
| 5,790,198 A | 8/1998 | Roop et al. |
| 5,790,202 A | 8/1998 | Kummer et al. |
| 5,798,717 A | 8/1998 | Bakhmutsky et al. |
| 5,801,787 A | 9/1998 | Schein et al. |
| 5,808,608 A | 9/1998 | Young et al. |
| 5,809,204 A | 9/1998 | Young et al. |
| 5,809,472 A | 9/1998 | Morrison |
| 5,812,205 A | 9/1998 | Milnes et al. |
| 5,815,671 A | 9/1998 | Morrison |
| 5,818,934 A | 10/1998 | Cuccia |
| 5,828,945 A | 10/1998 | Klosterman |
| 5,835,786 A | 11/1998 | Brown et al. |
| 5,838,873 A | 11/1998 | Blatter et al. |
| 5,841,940 A | 11/1998 | Haines |
| 5,844,478 A | 12/1998 | Blatter et al. |
| 5,844,595 A | 12/1998 | Blatter et al. |
| 5,852,478 A | 12/1998 | Kwoh |
| 5,862,390 A | 1/1999 | Ranjan |
| 5,867,207 A | 2/1999 | Chaney et al. |
| 5,870,150 A | 2/1999 | Yuen |
| 5,872,588 A | 2/1999 | Aras et al. |
| 5,875,235 A | 2/1999 | Mohajeri |
| 5,878,135 A | 3/1999 | Blatter et al. |
| 5,886,746 A | 3/1999 | Yuen et al. |
| 5,889,656 A | 3/1999 | Yin |
| 5,896,322 A | 4/1999 | Ishii |
| 5,903,180 A | 5/1999 | Hsia |
| 5,907,249 A | 5/1999 | Hsia et al. |
| 5,909,429 A | 6/1999 | Satyanarayana et al. |
| 5,915,026 A | 6/1999 | Mankovitz |
| 5,915,068 A | 6/1999 | Levine |
| 5,923,362 A | 7/1999 | Klosterman |
| 5,923,666 A | 7/1999 | Gledhill et al. |
| 5,933,500 A | 8/1999 | Blatter et al. |
| 5,939,975 A | 8/1999 | Tsuria et al. |
| 5,940,073 A | 8/1999 | Klosterman et al. |
| 5,940,510 A * | 8/1999 | Curry et al. ..................... 705/65 |
| 5,949,471 A | 9/1999 | Yuen et al. |
| 5,949,476 A | 9/1999 | Pocock et al. |
| 5,949,954 A | 9/1999 | Young et al. |
| 5,956,034 A | 9/1999 | Sachs et al. |
| 5,956,629 A | 9/1999 | Morrison |
| 5,959,592 A | 9/1999 | Petruzzelli |
| 5,959,688 A | 9/1999 | Schein et al. |

(56) References Cited

U.S. PATENT DOCUMENTS

| | | |
|---|---|---|
| 5,963,264 A | 10/1999 | Jackson |
| 5,966,036 A | 10/1999 | Hoff et al. |
| 5,969,748 A | 10/1999 | Casement et al. |
| 5,970,206 A | 10/1999 | Yuen et al. |
| 5,973,511 A | 10/1999 | Hsia et al. |
| 5,974,193 A | 10/1999 | Baudouin |
| 5,974,222 A | 10/1999 | Yuen et al. |
| 5,977,804 A | 11/1999 | Beech |
| 5,979,724 A | 11/1999 | Loewenthal, Jr. et al. |
| 5,987,213 A | 11/1999 | Mankovitz et al. |
| 5,988,078 A | 11/1999 | Levine |
| 5,990,890 A | 11/1999 | Etheredge |
| 5,991,498 A | 11/1999 | Young |
| 5,991,799 A | 11/1999 | Yen et al. |
| 6,002,394 A | 12/1999 | Schein et al. |
| 6,005,432 A | 12/1999 | Guo et al. |
| 6,016,348 A | 1/2000 | Blatter et al. |
| 6,018,372 A | 1/2000 | Etheredge |
| 6,028,599 A | 2/2000 | Yuen et al. |
| 6,034,738 A | 3/2000 | Sparks |
| 6,040,737 A | 3/2000 | Ranjan et al. |
| 6,044,448 A | 3/2000 | Agrawal et al. |
| 6,049,652 A | 4/2000 | Yuen et al. |
| 6,052,145 A | 4/2000 | Macrae et al. |
| 6,052,312 A | 4/2000 | Ishii |
| 6,057,890 A | 5/2000 | Virden et al. |
| 6,065,104 A | 5/2000 | Tng |
| 6,072,520 A | 6/2000 | Yuen et al. |
| 6,072,983 A | 6/2000 | Klosterman |
| 6,075,396 A | 6/2000 | Amerian et al. |
| 6,075,398 A | 6/2000 | Furman |
| 6,075,575 A | 6/2000 | Schein et al. |
| 6,078,348 A | 6/2000 | Klosterman et al. |
| 6,084,573 A | 7/2000 | Tsai et al. |
| 6,091,882 A | 7/2000 | Yuen et al. |
| 6,093,029 A | 7/2000 | Kwon et al. |
| RE36,801 E | 8/2000 | Logan et al. |
| 6,108,789 A | 8/2000 | Dancs et al. |
| 6,111,612 A | 8/2000 | Ozkan et al. |
| 6,112,262 A | 8/2000 | Goettsch |
| 6,112,305 A | 8/2000 | Dancs et al. |
| 6,118,492 A | 9/2000 | Milnes et al. |
| 6,125,147 A | 9/2000 | Florencio et al. |
| 6,133,909 A | 10/2000 | Schein et al. |
| 6,133,910 A | 10/2000 | Stinebruner |
| 6,137,542 A | 10/2000 | Van Mourik |
| 6,137,950 A | 10/2000 | Yuen |
| 6,141,752 A | 10/2000 | Dancs et al. |
| 6,144,401 A | 11/2000 | Casement et al. |
| 6,151,059 A | 11/2000 | Schein et al. |
| 6,151,479 A | 11/2000 | Kummer |
| 6,154,214 A | 11/2000 | Uyehara et al. |
| 6,158,033 A | 12/2000 | Wagner et al. |
| 6,160,587 A | 12/2000 | Walker et al. |
| 6,160,707 A | 12/2000 | Yin |
| 6,167,188 A | 12/2000 | Young et al. |
| 6,169,418 B1 | 1/2001 | Wagner |
| 6,169,541 B1 | 1/2001 | Smith |
| 6,172,674 B1 | 1/2001 | Etheredge |
| 6,173,112 B1 | 1/2001 | Gruse et al. |
| 6,175,628 B1 | 1/2001 | Reinold et al. |
| 6,175,851 B1 | 1/2001 | Iourcha et al. |
| 6,177,961 B1 | 1/2001 | Blatter |
| 6,178,242 B1 | 1/2001 | Tsuria |
| 6,181,344 B1 | 1/2001 | Tarpenning et al. |
| 6,184,877 B1 | 2/2001 | Dodson et al. |
| 6,195,667 B1 | 2/2001 | Duga et al. |
| 6,198,728 B1 | 3/2001 | Hulyalker et al. |
| 6,204,796 B1 | 3/2001 | Chan et al. |
| 6,204,885 B1 | 3/2001 | Kwoh |
| 6,208,167 B1 | 3/2001 | Ranjan et al. |
| 6,208,804 B1 | 3/2001 | Ottesen et al. |
| 6,212,490 B1 | 4/2001 | Li et al. |
| 6,215,526 B1 | 4/2001 | Barton et al. |
| 6,216,265 B1 | 4/2001 | Roop et al. |
| 6,227,974 B1 | 5/2001 | Eilat et al. |
| 6,233,389 B1 | 5/2001 | Barton et al. |
| 6,239,794 B1 | 5/2001 | Yuen et al. |
| 6,243,145 B1 | 6/2001 | Schlarb et al. |
| 6,247,176 B1 | 6/2001 | Schein et al. |
| 6,247,950 B1 | 6/2001 | Hallam et al. |
| 6,265,899 B1 | 7/2001 | Abdel-Hafeez et al. |
| 6,275,097 B1 | 8/2001 | Liang et al. |
| 6,275,934 B1 | 8/2001 | Novicov et al. |
| 6,285,396 B1 | 9/2001 | Shoshanim et al. |
| 6,285,746 B1 | 9/2001 | Duran et al. |
| 6,289,129 B1 | 9/2001 | Chen et al. |
| 6,304,268 B1 | 10/2001 | Iourcha et al. |
| 6,310,886 B1 | 10/2001 | Barton |
| 6,312,336 B1 | 11/2001 | Handelman et al. |
| 6,314,474 B1 | 11/2001 | Walter et al. |
| 6,321,381 B1 | 11/2001 | Yuen et al. |
| 6,323,911 B1 | 11/2001 | Schein et al. |
| 6,324,338 B1 | 11/2001 | Wood et al. |
| 6,326,969 B1 | 12/2001 | Helman et al. |
| 6,326,970 B1 | 12/2001 | Mott et al. |
| 6,327,245 B1 | 12/2001 | Satyanarayana et al. |
| 6,327,418 B1 | 12/2001 | Barton |
| 6,330,334 B1 | 12/2001 | Ryan |
| 6,331,865 B1 | 12/2001 | Sachs et al. |
| 6,331,867 B1 | 12/2001 | Eberhard et al. |
| 6,341,195 B1 | 1/2002 | Mankovitz et al. |
| 6,341,374 B2 | 1/2002 | Schein et al. |
| 6,351,750 B1 | 2/2002 | Duga et al. |
| 6,356,287 B1 | 3/2002 | Ruberry et al. |
| 6,356,509 B1 | 3/2002 | Abdel-Hafeez et al. |
| 6,360,053 B1 | 3/2002 | Wood et al. |
| 6,363,213 B1 | 3/2002 | Sparks et al. |
| 6,363,418 B1 | 3/2002 | Conboy et al. |
| 6,363,487 B1 | 3/2002 | Schneider |
| 6,370,662 B2 | 4/2002 | Hamidi |
| 6,381,741 B1 | 4/2002 | Shaw |
| 6,385,651 B2 | 5/2002 | Dancs et al. |
| 6,385,739 B1 | 5/2002 | Barton et al. |
| 6,387,720 B1 | 5/2002 | Misheloff et al. |
| 6,388,714 B1 | 5/2002 | Schein et al. |
| 6,389,566 B1 | 5/2002 | Wagner et al. |
| 6,393,600 B1 | 5/2002 | Sribhashyam et al. |
| 6,397,388 B1 | 5/2002 | Allen |
| 6,400,371 B1 | 6/2002 | Helman et al. |
| 6,412,110 B1 | 6/2002 | Schein et al. |
| 6,424,947 B1 | 7/2002 | Tsuria et al. |
| 6,425,128 B1 | 7/2002 | Krapf et al. |
| 6,430,358 B1 | 8/2002 | Yuen et al. |
| 6,430,359 B1 | 8/2002 | Yuen et al. |
| 6,434,097 B1 | 8/2002 | Lewis et al. |
| 6,442,328 B1 | 8/2002 | Elliott et al. |
| 6,449,632 B1 | 9/2002 | David et al. |
| 6,449,767 B1 | 9/2002 | Krapf et al. |
| 6,453,115 B1 | 9/2002 | Boyle |
| 6,453,471 B1 | 9/2002 | Klosterman |
| 6,456,331 B2 | 9/2002 | Kwoh |
| RE37,881 E | 10/2002 | Haines |
| 6,459,427 B1 | 10/2002 | Mao et al. |
| 6,460,181 B1 | 10/2002 | Donnelly |
| 6,461,908 B2 | 10/2002 | Stolk et al. |
| 6,463,206 B1 | 10/2002 | Yuen et al. |
| 6,463,586 B1 | 10/2002 | Jerding |
| 6,466,670 B1 | 10/2002 | Tsuria et al. |
| 6,466,734 B2 | 10/2002 | Yuen et al. |
| 6,469,753 B1 | 10/2002 | Klosterman et al. |
| 6,473,149 B2 | 10/2002 | Melnik et al. |
| 6,473,858 B1 | 10/2002 | Shimomura et al. |
| 6,473,903 B2 | 10/2002 | Balakrishnan et al. |
| 6,476,563 B2 | 11/2002 | Silvestre |
| 6,476,672 B2 | 11/2002 | Berkhout |
| 6,477,705 B1 | 11/2002 | Yuen et al. |
| 6,480,070 B2 | 11/2002 | Locher |
| 6,480,584 B2 | 11/2002 | Duran et al. |
| 6,483,259 B1 | 11/2002 | Kramer |
| 6,483,986 B1 | 11/2002 | Krapf |
| 6,486,804 B2 | 11/2002 | Coene |
| 6,487,534 B1 | 11/2002 | Thelen et al. |
| 6,487,646 B1 | 11/2002 | Adams et al. |

(56) References Cited

U.S. PATENT DOCUMENTS

| | | | |
|---|---|---|---|
| 6,488,379 | B2 | 12/2002 | Kane |
| 6,488,664 | B1 | 12/2002 | Solomon et al. |
| 6,489,631 | B2 | 12/2002 | Young et al. |
| 6,489,986 | B1 | 12/2002 | Allen |
| 6,490,000 | B1 | 12/2002 | Schaefer et al. |
| 6,490,432 | B1 | 12/2002 | Wegener et al. |
| 6,490,722 | B1 | 12/2002 | Barton et al. |
| 6,493,734 | B1 | 12/2002 | Sachs et al. |
| 6,494,381 | B2 | 12/2002 | Bulthuis |
| 6,496,233 | B1 | 12/2002 | Christine et al. |
| 6,496,387 | B2 | 12/2002 | Halberstadt |
| 6,498,071 | B2 | 12/2002 | Hijzen et al. |
| 6,498,754 | B2 | 12/2002 | Peting et al. |
| 6,498,809 | B1 | 12/2002 | Dean et al. |
| 6,498,811 | B1 | 12/2002 | Van Der Vleuten |
| 6,498,895 | B2 | 12/2002 | Young et al. |
| 6,499,103 | B1 | 12/2002 | Tsyrua et al. |
| 6,501,797 | B1 | 12/2002 | Van Der Schaar et al. |
| 6,505,348 | B1 | 1/2003 | Knowles et al. |
| 6,513,116 | B1 | 1/2003 | Valente |
| 6,513,117 | B2 | 1/2003 | Tarpenning et al. |
| 6,516,376 | B1 | 2/2003 | Christine et al. |
| 6,519,688 | B1 | 2/2003 | Lu et al. |
| 6,526,471 | B1 | 2/2003 | Shimomura et al. |
| 6,526,580 | B2 | 2/2003 | Shimomura et al. |
| 6,529,233 | B1 | 3/2003 | Allen |
| 6,529,526 | B1 | 3/2003 | Schneidewend |
| 6,529,685 | B2 | 3/2003 | Ottensen et al. |
| 6,533,727 | B1 | 3/2003 | Brock-Fisher |
| 6,535,253 | B2 | 3/2003 | Barton et al. |
| 6,538,701 | B1 | 3/2003 | Yuen |
| 6,542,550 | B1 | 4/2003 | Schreiber |
| 6,547,423 | B2 | 4/2003 | Marshall et al. |
| 6,549,719 | B2 | 4/2003 | Mankovitz |
| 6,559,866 | B2 | 5/2003 | Kolde et al. |
| 6,559,894 | B2 | 5/2003 | Omura et al. |
| 6,560,678 | B1 | 5/2003 | Weissman |
| 6,567,606 | B2 | 5/2003 | Milnes et al. |
| 6,567,660 | B1 | 5/2003 | Wegener |
| 6,570,948 | B1 | 5/2003 | Marshall |
| 6,574,417 | B1 | 6/2003 | Lin et al. |
| 6,577,351 | B1 | 6/2003 | Yu et al. |
| 6,578,106 | B1 | 6/2003 | Price |
| 6,587,561 | B1 | 7/2003 | Sered et al. |
| 6,604,242 | B1 | 8/2003 | Weinstein et al. |
| 6,606,281 | B2 | 8/2003 | Cowgill et al. |
| 6,608,994 | B1 | 8/2003 | Wegener et al. |
| 6,609,097 | B2 | 8/2003 | Costello et al. |
| 6,614,987 | B1 | 9/2003 | Ismail et al. |
| 6,621,819 | B1 | 9/2003 | Coppola et al. |
| 6,622,007 | B2 | 9/2003 | Linden |
| 6,629,243 | B1 | 9/2003 | Kleinman et al. |
| 6,630,963 | B1 | 10/2003 | Billmaier |
| 6,633,877 | B1 | 10/2003 | Saigh et al. |
| 6,637,029 | B1 | 10/2003 | Maissel et al. |
| 6,639,577 | B2 | 10/2003 | Eberhard |
| 6,642,939 | B1 | 11/2003 | Vallone et al. |
| 6,643,798 | B2 | 11/2003 | Barton et al. |
| 6,654,546 | B1 | 11/2003 | Levin et al. |
| 6,668,133 | B2 | 12/2003 | Yuen et al. |
| 6,668,326 | B1 | 12/2003 | Sella et al. |
| 6,674,129 | B1 | 1/2004 | Colclaser et al. |
| 6,675,385 | B1 | 1/2004 | Wang |
| 6,675,387 | B1 | 1/2004 | Boucher et al. |
| 6,681,393 | B1 | 1/2004 | Bauminger et al. |
| 6,681,396 | B1 | 1/2004 | Bates et al. |
| 6,708,251 | B1 | 3/2004 | Boyle et al. |
| 6,710,815 | B1 | 3/2004 | Billmaier et al. |
| 6,721,953 | B1 | 4/2004 | Bates et al. |
| 6,725,421 | B1 | 4/2004 | Boucher et al. |
| 6,727,935 | B1 | 4/2004 | Allen et al. |
| 6,728,713 | B1 | 4/2004 | Beach et al. |
| 6,732,325 | B1 | 5/2004 | Tash et al. |
| 6,732,369 | B1 | 5/2004 | Schein et al. |
| 6,744,967 | B2 | 6/2004 | Kaminski et al. |
| 6,745,368 | B1 | 6/2004 | Boucher et al. |
| 6,751,402 | B1 | 6/2004 | Elliott et al. |
| 6,754,894 | B1 | 6/2004 | Costello et al. |
| 6,756,997 | B1 | 6/2004 | Ward, III et al. |
| 6,757,837 | B1 | 6/2004 | Platt et al. |
| 6,757,906 | B1 | 6/2004 | Look et al. |
| 6,760,537 | B2 | 7/2004 | Mankovitz |
| 6,760,918 | B2 | 7/2004 | Rodriguez et al. |
| 6,762,773 | B2 | 7/2004 | Kolde et al. |
| 6,766,148 | B1 | 7/2004 | Mohindra |
| 6,772,435 | B1 | 8/2004 | Thexton et al. |
| 6,785,389 | B1 | 8/2004 | Sella et al. |
| 6,788,710 | B1 | 9/2004 | Knutson et al. |
| 6,792,195 | B2 | 9/2004 | Barton |
| 6,798,457 | B2 | 9/2004 | Boyden et al. |
| 6,813,643 | B2 | 11/2004 | Perlman |
| 6,817,028 | B1 | 11/2004 | Jerding et al. |
| 6,832,041 | B1 | 12/2004 | Boyle |
| 6,832,386 | B1 | 12/2004 | Jerding et al. |
| 6,836,514 | B2 | 12/2004 | Gandhi et al. |
| 6,842,484 | B2 | 1/2005 | Gandhi et al. |
| 6,842,837 | B1 | 1/2005 | Peting et al. |
| 6,847,778 | B1 | 1/2005 | Vallone et al. |
| 6,848,051 | B2 | 1/2005 | Wachtfogel et al. |
| 6,850,691 | B1 | 2/2005 | Van Stam et al. |
| 6,850,693 | B2 | 2/2005 | Young et al. |
| 6,859,799 | B1 | 2/2005 | Yuen |
| 6,861,952 | B1 | 3/2005 | Billmaier |
| 6,865,336 | B2 | 3/2005 | Johnson |
| 6,865,555 | B2 | 3/2005 | Novak |
| 6,868,225 | B1 | 3/2005 | Brown et al. |
| 6,880,081 | B1 | 4/2005 | Itkis |
| 6,882,046 | B2 | 4/2005 | Davenport et al. |
| 6,886,178 | B1 | 4/2005 | Mao et al. |
| 6,889,322 | B1 | 5/2005 | Levy |
| 6,915,528 | B1 | 7/2005 | McKenna, Jr. |
| 6,917,913 | B2 | 7/2005 | Law et al. |
| 6,922,805 | B2 | 7/2005 | Reme et al. |
| 6,927,103 | B2 | 8/2005 | Letavic et al. |
| 6,927,574 | B2 | 8/2005 | Young et al. |
| 6,927,806 | B2 | 8/2005 | Chan |
| 6,930,973 | B2 | 8/2005 | Hendriks et al. |
| 6,934,713 | B2 | 8/2005 | Schwartz et al. |
| 6,934,855 | B1 | 8/2005 | Kipnis et al. |
| 6,941,575 | B2 | 9/2005 | Allen |
| 6,943,843 | B2 | 9/2005 | Boyden et al. |
| 6,944,880 | B1 | 9/2005 | Allen |
| 6,948,185 | B1 | 9/2005 | Chapel et al. |
| 7,111,321 | B1* | 9/2006 | Watts et al. ............ 726/2 |
| 2005/0015609 | A1* | 1/2005 | Delorme ............ 713/193 |
| 2005/0018472 | A1* | 1/2005 | Lim ............ 365/154 |
| 2006/0010500 | A1* | 1/2006 | Elazar et al. ............ 726/27 |
| 2006/0059375 | A1* | 3/2006 | Ooshima et al. ............ 713/193 |
| 2008/0034223 | A1* | 2/2008 | Funahashi ............ 713/193 |
| 2008/0063197 | A1* | 3/2008 | Jaquette et al. ............ 380/201 |
| 2008/0235140 | A1* | 9/2008 | Read ............ 705/59 |

OTHER PUBLICATIONS

LinuxConfig.org, 'USB stick encryption using Linux', LinuxConfig.org, 2007-2015, entire document, http://linuxconfig.org/index.php/usb-stick-encryption-using-linux.*

* cited by examiner

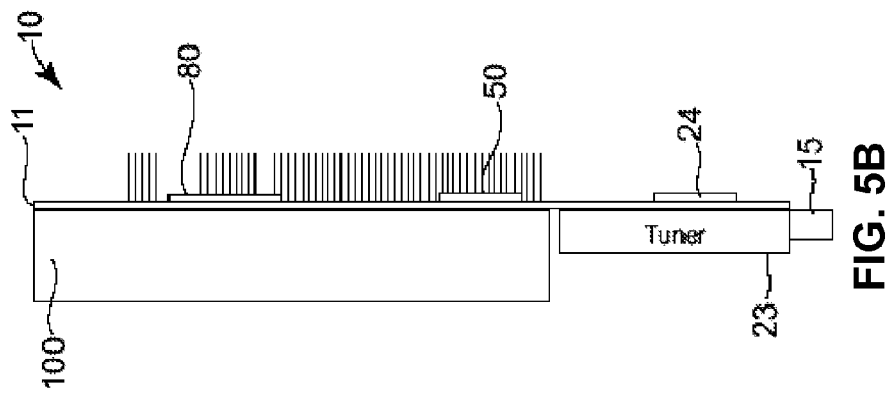
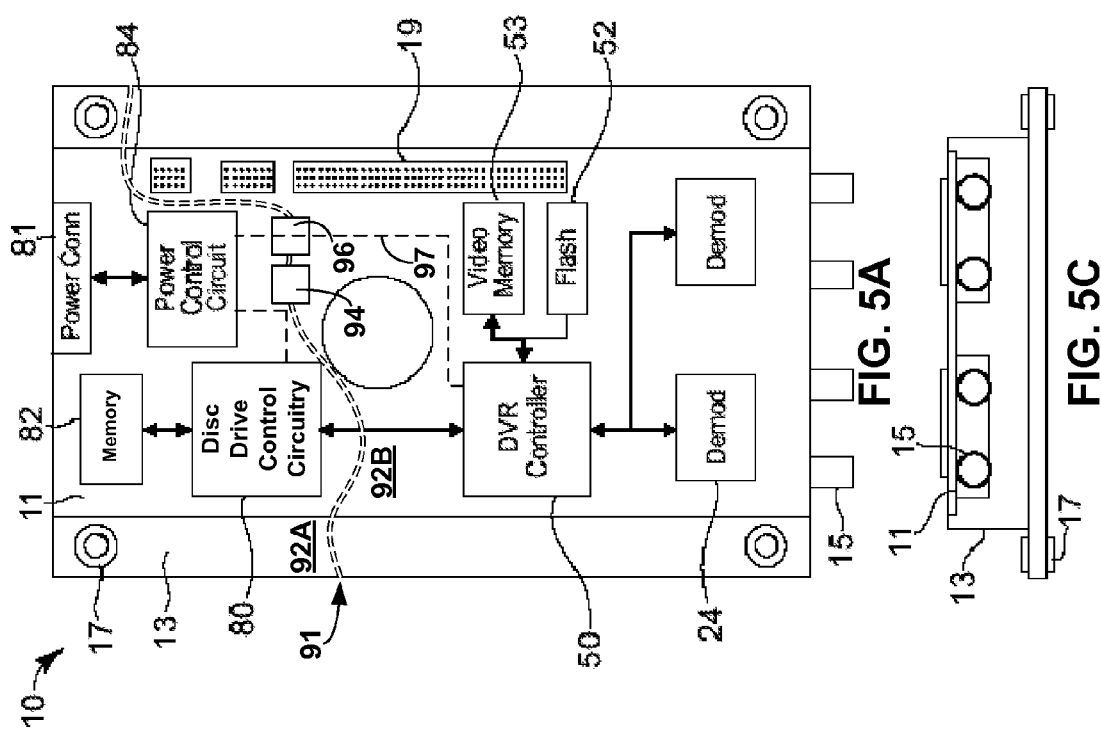

PREVENT DATA STORAGE DEVICE CIRCUITRY SWAP

TECHNICAL FIELD

This application relates to data storage devices and, in particular, but without limitation, to disc drives.

BACKGROUND

The use of digital data storage devices has expanded beyond computer data storage to include media content. For example, many devices now store pictures, music, movies and other media content digitally. While digital storage offers advantages for consumers compared to analog, digital storage of media content has created difficulties for copyright holders of the media content as digital information is easily copied and distributed. Unauthorized copying and distribution of copyrighted material limits the ability of copyright holders to protect and sell their copyrighted media content.

Accordingly, techniques to prevent unauthorized copying and distribution of copyrighted material would be useful to maintain the legitimate market for copyrighted media content.

SUMMARY

In general, the invention relates to techniques for preventing unauthorized access of content stored on a data storage device. For example, a data storage device may include a data storage media and control circuitry for retrieving data content stored on the data storage media. The control circuitry may include mechanisms to prevent copying of the data content and mechanisms to prevent different control circuitry from accessing the data content. In particular, all control circuitries compatible with the data storage media in the data storage device may be configured to prevent access to data content, e.g., high value data content, on the data storage media if the control circuitry attempting to access the data content is not the same as the control circuitry that wrote that data content to the data storage media.

For example, the data storage media may be locked to the control circuitry by an encrypted security key. In an embodiment, a control circuitry may include a hidden root key used to encrypt keys that are stored on the data storage media. The keys stored on the data storage media are in turn used to encrypt data content, e.g., high value data content or all data content, stored on the data storage media. In the event the control circuitry was replaced with a different control circuitry, e.g., a control circuitry that would allow copying and distribution of content stored on the media, the new control circuitry would not have the correct root key to decrypt keys stored on the data storage media. Without the decrypted keys, content stored using those keys would be inaccessible.

As another example, control circuitries may store a digital signature corresponding to their hidden root key when writing protected data content to the data storage media. The digital signature on the data storage media may include an encrypted portion decipherable only with the hidden root key of the control circuitry that wrote the data content. The digital signature on the data storage media may also include an unencrypted portion that indicates to all control circuitries capable of reading data from the data storage media a write-protection status of data content or portions thereof stored on the data storage media.

All control circuitries capable of reading data from the data storage media may be configured to check for a digital signature on the data storage media prior to accessing data content. If a control circuitry finds that the digital signature on a data storage media does not correspond to its hidden root key, the control circuitry may prevent access to data content stored on the data storage media associated with the unmatched digital signature.

In an embodiment, a device comprises a data storage media storing data content and a digital signature. At least a portion of the digital signature is encrypted on the data storage media. The device also includes a removable control circuitry including a unique key. If the unique key corresponds to the encrypted portion of the digital signature, the removable control circuitry allows access to the data content. If the unique key does not correspond to the encrypted portion of the digital signature, the removable control circuitry prevents access to the data content.

In another embodiment, a device comprises a data storage media storing data content, At least a portion of the data content is encrypted data content on the data storage media. The device also includes a removable control circuitry including a unique key. If the unique key corresponds to the encrypted data content, the removable control circuitry allows access to the encrypted data content. If the unique key does not correspond to the encrypted data content, the removable control circuitry prevents access to the encrypted data content.

An embodiment is directed to a device comprising a data storage media, a control circuitry that retrieves data content stored in the data storage media and a means to prevent a user from accessing the data content without using the control circuitry.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

FIGS. 5A-5C are top, side, and bottom side views, respectively, illustrating an example embodiment of a disc drive assembly adapted to record and play video content.

DETAILED DESCRIPTION

Figure 1:
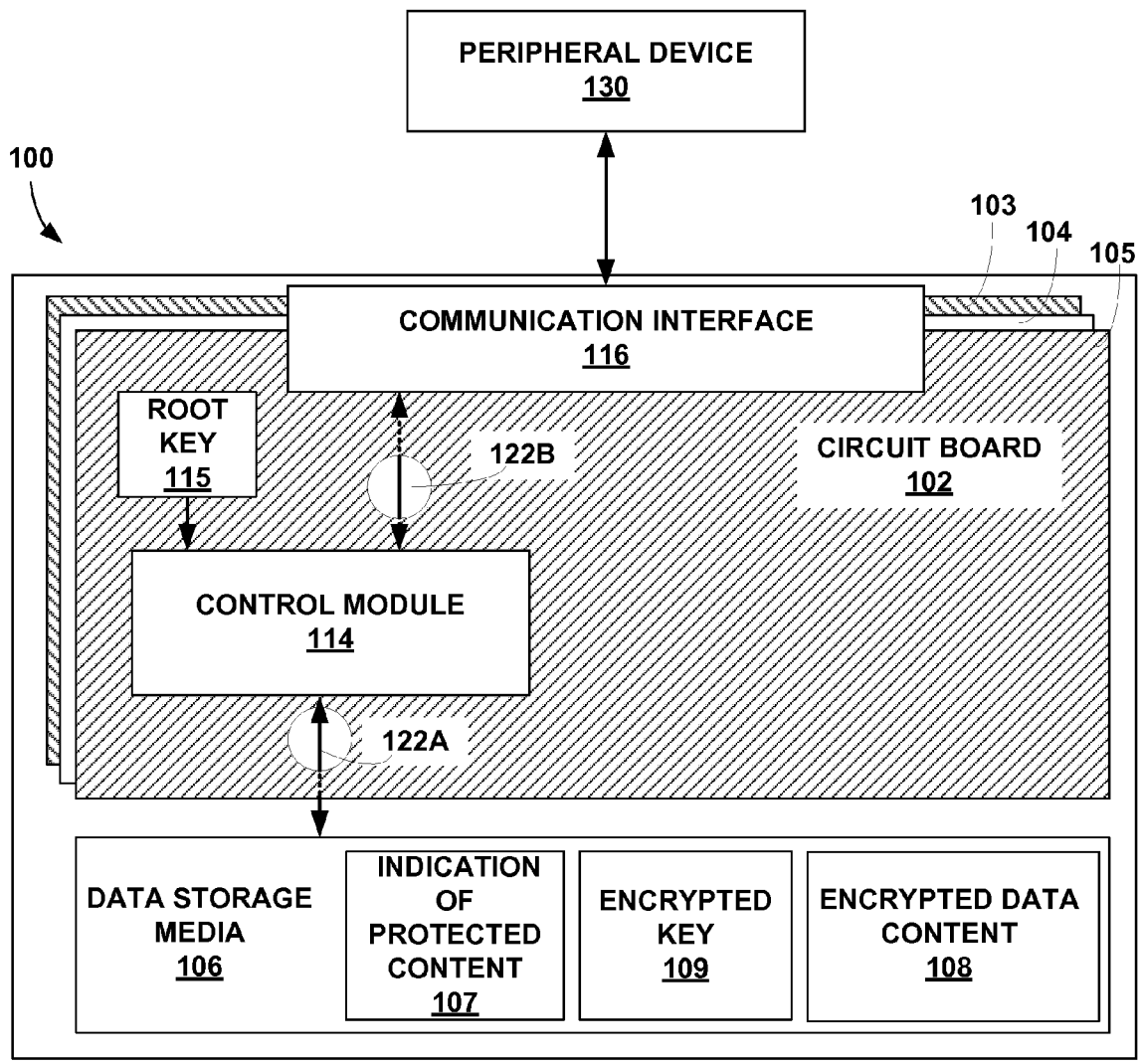
FIG. 1 illustrates a data storage device including a circuit board with a root key used to encrypt data content stored on a data storage media of the data storage device.

FIG. 1 illustrates data storage device 100, which includes circuit board 102, the control circuitry of data storage device 100. Circuit board 102 includes control module 114, root key 115 and communication interface 116. Data storage device 100 also includes data storage media 106, which stores encrypted data content 108. For example, data storage media 106 may be a rewriteable media disc and data storage device 100 may be a disc drive. In other embodiments, data storage media 106 may be a semiconductor memory, such as random access memory (RAM), read-only memory (ROM), non-volatile random access memory (NVRAM), electrically erasable programmable read-only memory (EEPROM) or FLASH memory, other magnetic media, optical media, or the like. Data storage device 100 provides a means to prevent a user from accessing encrypted data content 108 without using circuit board 102. As an example, encrypted data content 108 may include copyrighted media content not licensed for copying or distribution by a user of data storage device 100.

Control module 114 sends and retrieves data content to data storage media 106. In embodiments where data storage device 100 is a disc drive, control module 114 may include a channel that converts analog signals measured by a head traversing a media disc of data storage media 106 to digital signals. In such embodiments, control module 114 converts digital data into analog signals to write data to data storage media 106. Conversely, control module 114 converts analog signals read from data storage media 106 into digital data.

Control module 114 also sends data content to peripheral device 130 via communication interface 116. Control module 114 may send data content to communication interface as a digital signal or as analog signal, e.g., as an analog video signal. In some embodiments, control module 114 may also receive data content from peripheral device 130 via communication interface 116.

Control module 114 uses root key 115 to encrypt some or all data content before storing it data storage media 106. Root key 115 is a unique root key; i.e., it is unique to circuit board 102 and not commonly used in a multitude of circuit boards similar to circuit board 102. Control module 114 also decrypts encrypted data content, e.g., encrypted data content 108, before forwarding the data content to peripheral device 130 via communication interface 116.

Encrypted data content 108 may include high-value or proprietary data on data storage media 106. Encrypted data content 108 is encrypted with key 109. In turn, key 109 is encrypted with root key 115, which is stored in memory on circuit board 102. Because key 109 is required to decoded encrypted data content 108 and because root key 115 is required to decode key 109, root key 115 and key 109 are required to decode encrypted data content 108. Circuit board 102 must be paired with data storage media 106 to access encrypted data content 108 because root key 115 is stored only on circuit board 102 and not on data storage media 106.

Data storage device 100 prevents access to encrypted data content 108 on data storage media 106 if root key 115 does not correspond to encrypted data content 108. For example, if circuit board 102 is not the same as the control circuitry used to write encrypted data content 108 to data storage media 106, root key 115 may not correspond to encrypted data content 108. This may prevent access to encrypted data content 108 using control circuitry with different features than the control circuitry used to encrypted data content 108. For example, circuit board 102 may include only analog video inputs and outputs, while a different circuit board compatible with data storage media 106 may include digital inputs and outputs suitable for copying encrypted data content 108. By preventing a user from digitally copying encrypted data content 108 a user may be prevented from unauthorized copying or distribution of encrypted data content 108. For example, in the event encrypted data content 108 contains copyrighted material, a user may be prevented from distributing the copyrighted material.

Data storage media 106 may also include unencrypted data content (not shown in FIG. 1). Data storage media 106 may include additional sections of encrypted data content in addition to encrypted data content 108. These sections may be encrypted with a second key (not shown), functionally similar to key 109. The second key may also be stored on data storage media 106.

Data storage media 106 also includes an indication 107 that data storage media 106 is storing protected data content. The protected data content may include unencrypted data content (not shown), all or a portion of encrypted data content 108, or a combination thereof. Indication 107 allows circuit board 102 and other control circuitries compatible with data storage media 106 to recognize that data content on data storage media 106 is protected, even if the protected data content is encrypted. This allows control circuitries that do not include a root key that corresponds to encrypted data content 108 to take action to prevent a user from unauthorized access of the protected data content. For example, a control circuitry may delete the protected data content. As another example, a control circuitry may simply refuse to output the data content to a peripheral device. This may prevent a user from unauthorized decryption of encrypted data content 108. In this manner, data storage device 100 is different than other secure data storage devices that do not recognize if a root key does not correspond to encryption of stored data content and may decrypt data using the wrong root key.

Data storage device 100 includes a variety of features to prevent unauthorized access to encrypted data content 108. For example, root key 115 is not editable or accessible to a user. This may prevent a user from decoding encrypted data content 108 using software. Additionally, data signal paths 122A-C (collectively "data signal paths 122"), are located on plane 104 of circuit board 102. Plane 104 is located between ground plane 103 and power plane 105. This may prevent a user from intercepting a signal traversing one of data signal paths 122. As another example, control modules may be programmed to delete data content stored on data storage media 106 if key 109 is not encrypted with root key 115. This would permanently prevent a user from accessing data content in the event it was not written using circuit board 102 or another circuit board with the same root key as root key 115 on circuit board 102. Other control circuitries compatible with data storage media 106 may also be programmed to delete data content in the event that key 109 is not encrypted with the root key associated with the control circuitry accessing encrypted data content 108. In other embodiments, control circuitries may simply delete key 109 itself if it does not correspond to a root key stored on the control circuitry. Deleting key 109 would render encrypted data content 108 permanently unreadable because key 109 is required to decrypt encrypted data content 108.

Data storage device 100 communicates with peripheral device 130 to send and/or receive data. In some embodiments, data storage device 100 and peripheral device 130 may be components of a larger device, such as a cell phone, portable music player, portable video player or portable computing device. In such embodiments, peripheral device 130 may be a display, such as a liquid-crystal display (LCD) or plasma display, a speaker or circuitry that performs some functionality of the larger device. In different embodiments, peripheral device 130 may be a television, a remote computer, or even another data storage device.

Figure 2:
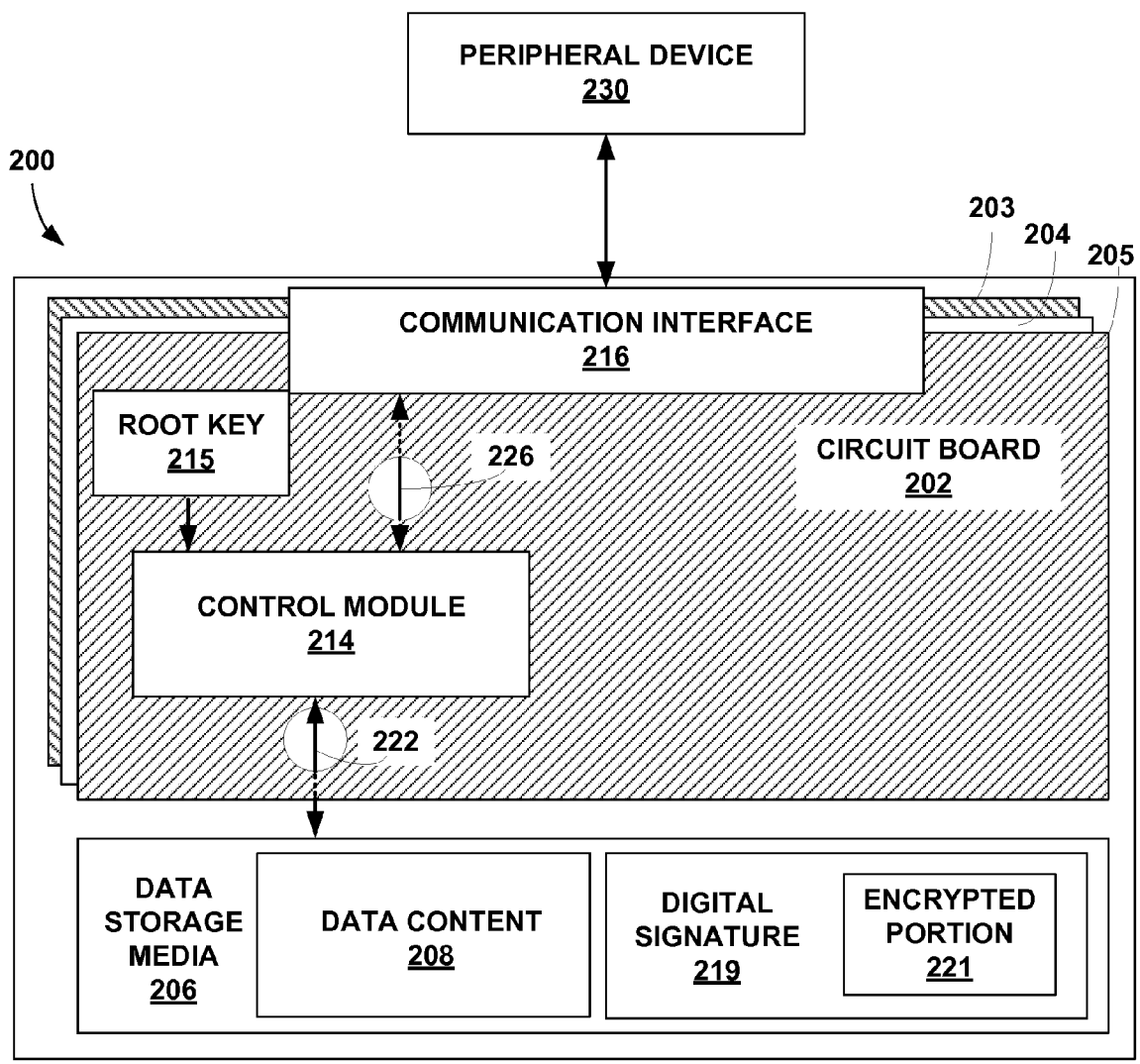
FIG. 2 illustrates a data storage device including a circuit board that uses a digital signature used to mark data content stored on a data storage media of the data storage device as having been written using the circuit board.

FIG. 2 illustrates data storage device 200, which includes circuit board 202, the control circuitry of data storage device 200. Circuit board 202 includes control module 214, root key 215 and communication interface 216. Data storage device 200 also includes data storage media 206, which stores data content 208. For example, data storage media 206 may be a rewriteable media disc and data storage device 200 may be a disc drive. In other embodiments, data storage media 206 may be a semiconductor memory, such as random access memory (RAM), read-only memory (ROM), non-volatile random access memory (NVRAM), electrically erasable programmable read-only memory (EEPROM) or FLASH memory, or other magnetic media, optical media, or the like. Data storage device 200 provides a means to prevent a user from accessing data content 208 without using circuit board 202. As an example, data content 208 may include copyrighted media content not licensed for copying or distribution by a user of data storage device 200. Data storage device 200 is substantially similar to data storage device 100 with the exception that data storage device uses root key 215 to create digital signature 219 on data storage media 208 instead encrypting data content directly with a root key to prevent a user from accessing data content 208 without using circuit board 202. For this reason, features of data storage device 200 that are in common with data storage device 100 (FIG. 1) are discussed in limited detail, and in some instances not at all.

Control module 214 stores data content on and retrieves data content from data storage media 206. Control module 214 also sends data content to peripheral device 230 via communication interface 216. Control module 214 may send data content to communication interface as a digital signal or as analog signal, e.g., as an analog video signal. In some embodiments, control module 214 may also receive data content from peripheral device 230 via communication interface 216.

Control module 214 writes digital signature 219 to data storage media 208 before writing data content 208 to data storage media 206. Digital signature 219 includes an unencrypted portion that indicates that data content 208 or at least a portion thereof is protected. The unencrypted portion of digital signature 219 indicates to all control circuitries compatible with data storage media 206 that data content 208 or a portion thereof is protected. Digital signature 219 also includes encrypted portion 221, which correlates digital signature 219 with root key 215. Encrypted portion 221 is encrypted to prevent a user from determining root key 215 from the content of digital signature. If a user were able to determine root key 215, the user may be able to use that information to subvert the write protection status of the protected portions of data content 208 by convincing a control circuitry that it had permission to access protected data content on data storage media 206.

Prior to retrieving data content 208, control module 214 examines digital signature 219 to ensure that digital signature 219 corresponds to root key 215. In the event digital signature 219 does not correspond to root key 215, control module 214 prevents access to data content 208 or a protected portion thereof. In some embodiments, control module 214 may also delete data content 208 if digital signature 219 does not correspond to root key 215 to permanently prevent access to data content 208.

Data storage device 200 prevents access to data content 208 on data storage media 206 if circuit board 202 is not the same as the control circuitry used to write data content 208 to data storage media 206. This may prevent access to data content 208 using control circuitry with different features than the control circuitry used to data content 208. For example, circuit board 202 may include only analog video inputs and outputs, while a different circuit board compatible with data storage media 206 may include digital inputs and outputs suitable for copying data content 208. By preventing a user from digitally copying data content 208 a user may be prevented from unauthorized copying or distribution of data content 208. For example, in the event data content 208 contains copyrighted material, a user may be prevented from distributing the copyrighted material.

Data storage device 200 includes a variety of features to prevent unauthorized access to data content 208. For example, data signal paths 222A-C (collectively "data signal paths 222"), are located on plane 204 of circuit board 202. Plane 204 is located between ground plane 203 and power plane 205. This may prevent a user from intercepting a signal traversing one of data signal paths 222. As another example, control module may be programmed to delete data content 208 if digital signature 219 does not correspond to root key 215. This would permanently prevent a user from accessing data content 208 in the event it was not written using circuit board 202 or another circuit board with the same root key as root key 215 on circuit board 202. Other control circuitries compatible with data storage media 206 may also be programmed to delete data content 208 in the event that digital signature 219 correspond to the root key associated with the control circuitry accessing data content 208.

Data storage device 200 communicates with peripheral device 230 to send and/or receive data. In some embodiments, data storage device 200 and peripheral device 230 may be components of a larger device, such as a cell phone, portable music player, portable video player or portable computing device. In such embodiments, peripheral device 230 may be a display, such as a liquid-crystal display (LCD) or plasma display, a speaker or circuitry that performs some functionality of the larger device. In different embodiments, peripheral device 230 may be a television, a remote computer, or even another data storage device.

FIGS. 3A-D and 4A-B demonstrate how a circuitry in a disc drive may be replaced without having to recalibrate the disc drive. For example, a disc drive may be first manufactured and calibrated with a first control circuitry used to connect a disc drive within a computer and then operated with a different, second control circuitry, such as control circuitry combining the control of the disc drive with the features of a larger device, such as a digital video recorder (DVR). This may be useful because legacy equipment used to calibrate disc drives may not have slots large enough to hold a circuit board larger than a standard circuit board.

The control circuitry of a disc drive assembly for a computer generally includes a standard interface, such as an Integrated Drive Electronics (IDE) interface, an Advance Technology Attachment (ATA) interface, a Fibre Channel interface (FC), Small Computer System Interface (SCSI) or a Serial Attached SCSI interface (SAS). A standard interface allows the disc drive to be installed in a computer, wherein content on the disc drive may be formatted, copied, distributed and made available on a public or private network. In contrast, the second control circuitry may include features to prevent unauthorized copying and distribution of copyrighted material recorded on the disc drive. The previously disclosed techniques may be used to prevent a user of a disc drive from replacing the second control circuitry with a control circuitry used to connect a disc drive within a computer. This may prevent a user from subverting the copyright protection features of the second control circuitry.

Figure 3A:
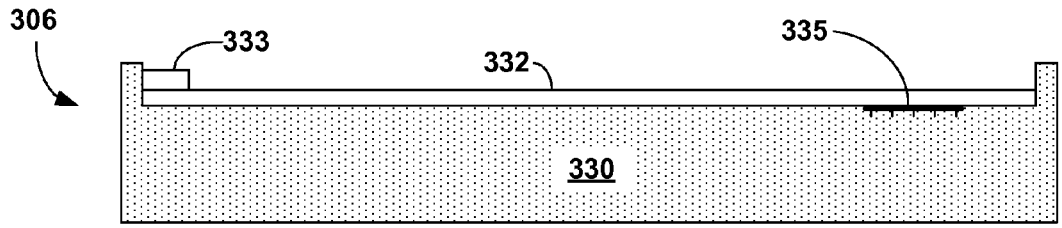
FIGS. 3A-3D illustrate exemplary steps of a control circuitry swap for a disc drive assembly.

FIGS. 3A-3D illustrate exemplary steps of a control circuitry swap for a disc drive assembly. FIG. 3A illustrates disc drive assembly 306. Disc drive assembly 306 includes disc drive housing 330, which encases a recordable media disc and a head to read and/or write data to the recordable media disc. For example, the recordable media disc may be a magnetic, optical or magneto-optic disc. In some embodiments, housing 330 may encase multiple recordable media discs in a stacked configuration. Some embodiments also include two heads for each media disc—one to read and/or write data for each side of a media disc.

Disc drive assembly 306 also includes circuit board 332. Circuit board 332 includes control circuitry to operate read and/or write operations from the head(s) to the media disc(s) within housing 330. Circuit board 332 controls disc drive functions within housing 330 via feed-through connectors 335.

As shown in FIG. 3A, circuit board 332 also includes disc drive interface 333. For example, disc drive interface 333 may be a standard disc drive interface commonly used to connect a disc drive within a computer. As examples, disc drive interface 333 may be an Integrated Drive Electronics (IDE) interface, an Advance Technology Attachment (ATA) interface, a serial ATA interface, a Consumer Electronics-ATA interface (CE-ATA) a Fibre Channel interface (FC), Small Computer System Interface (SCSI), a Serial Attached SCSI interface (SAS), a Universal Serial Bus (USB), a 1394 interface (FireWire), or another interface. In some embodiments, circuit board 332 may include multiple interfaces.

Disc drive assembly 306 is in a substantially ready-to-be-shipped form. For example, disc drive assembly 306 has been tested and calibrated, including calibration of the signal responses produced by heads within housing 330. As part of the testing, media discs within housing 330 may also have been media mapped, e.g., the recordable surfaces of the media disc may be tested to map unusable portions. Calibration data has been recorded and stored within housing 330. As an example, calibration data may have been recorded to a media disc within housing 330. In different embodiments, disc drive assembly 306 may or may not have been formatted. Disc drives to be installed in computers are often formatted by the manufacturer. Formatting generally includes creating sectors, writing configuration tables and setting recovery levels.

Figure 3B:
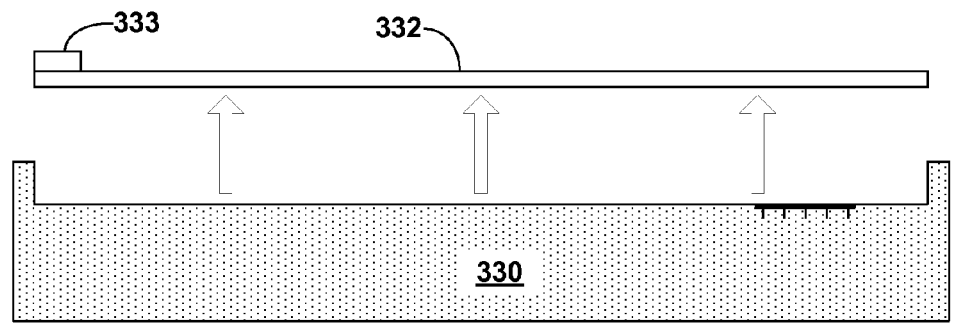

As shown in FIG. 3B, circuit board 332 is removed from housing 330. For example, circuit board 332 may be removed from housing 330 using automated manufacturing equipment. In some embodiments, this may require removing screws that attach circuit board 332 to housing 330.

Figure 3C:
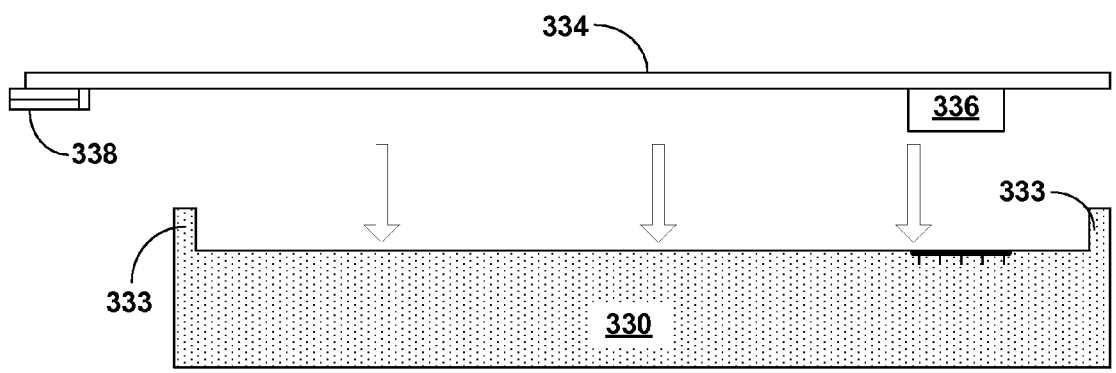

In FIG. 3C, circuit board 334 is attached to housing 330. For example, pick-and-place techniques may be used to attach circuit board 334 to housing 330. In some embodiments, attaching circuit board 334 to housing 330 may require screwing circuit board 334 to housing 330.

Figure 3D:
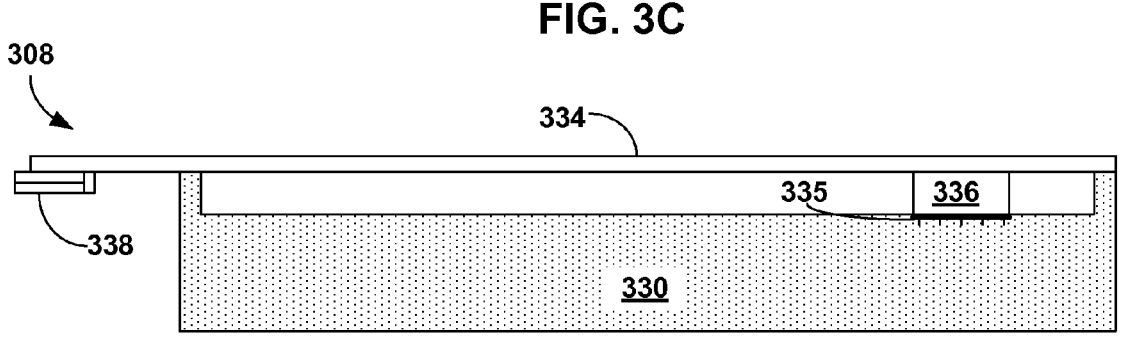

Once circuit board 334 is attached to housing 330, circuit board 334 and housing 330 combine to form disc drive assembly 308, as shown in FIG. 3D. Disc drive assembly 308 provides additional or different functionality compared to disc drive assembly 306. For example, disc drive control circuitry of circuit board 334 may operate in a different manner than disc drive control circuitry of circuit board 332. For example, control circuitry of circuit board 334 may skip over unreadable portions of data rather than spend time rereading those portions, which may be useful for audio or visual playback devices. Additional functionality provided by circuit board 334 may include functionality commonly implemented on a separate circuit board in a device including a stand-alone disc drive. For example, disc drive assembly 306 may be considered a stand-alone disc drive. As an example, if disc drive assembly 308 is to be included within a DVR, circuit board 334 may include additional features of the DVR. In some embodiments, a device including disc drive assembly 308 may include no additional or very limited circuitry beyond that incorporated within circuit board 334. Combining the functionality of disc drive control circuitry with other circuitry of a device onto a single circuit board, e.g., circuit board 334 may reduce the cost and size of the device compared to similar devices having separate circuit boards.

Because circuit board 334 includes additional functionality, and, therefore additional components, compared to circuit board 332, circuit board 334 is typically larger than circuit board 332. For this reason, circuit board 334 will not fit within the external recess of housing 330 created by walls 333. Circuit board 334 includes spacer 336 with electrical contacts to connect circuit board 334 to feed-through connectors 335.

Circuit board 334 includes interface 338. Interface 338 is different than interface 333. For example, interface 338 may be adapted for the device in which disc drive assembly 308 will be used. For example, if disc drive assembly 308 is to be included within a DVR, interface 333 may be a video input or output connection. As examples, interface 333 may be a Digital Visual Interface (DVI), a High-Definition Multi-media Interface (HDMI), a Multi-Media Card interface (MMC), a component video interface, a coaxial cable jack, a composite video interface, an s-video interface or a left-right audio interface. In some embodiments, circuit board 334 may include multiple interfaces, including the same interface(s) as interface 333.

Because interface 338 is different than interface 333, it is difficult to test and calibrate disc drive assembly 308 using the equipment used to test disc drive assembly 306. For example, interface 338 may capable of only outputting data and not capable of receiving commands. It is also difficult to test and calibrate disc drive assembly 308 and disc drive assembly 306 using the same equipment because disc drive assembly 308 has a different form factor than disc drive assembly 306. Simply, disc drive assembly 308 may not fit within a slot used to hold disc drives during testing and calibration. However, because calibration data was recorded within housing 330 from the testing and calibration of disc drive assembly 306, that calibration data can be used to operate disc drive assembly 308.

To ensure that the calibration data is sufficiently accurate, the design of control circuitry within circuit board 334 is very similar to that of control circuitry within circuit board 332. For example, the analog signal paths from heads within housing 330 may be substantially identical in circuit board 332 and circuit board 334. Furthermore, additional components within circuit board 334 may be shielded to limit interference between the analog signal paths. As another example, power and/or ground planes within circuit board 334 may be partitioned. The partitions may be electrically coupled using low-pass filters to limit high-frequency interferences created by the additional components on circuit board 334 compared to circuit board 332.

Circuit boards 332 and 334 may each be the same as circuit board 102 (FIG. 1) or circuit board 202 (FIG. 2). As such, circuit board 332 may prevent a user from accessing data content stored on a media disc within housing 330 using circuit board 334. Likewise, circuit board 334 may prevent a user from accessing data content stored on a media disc within housing 330 using circuit board 332.

Figure 4A:
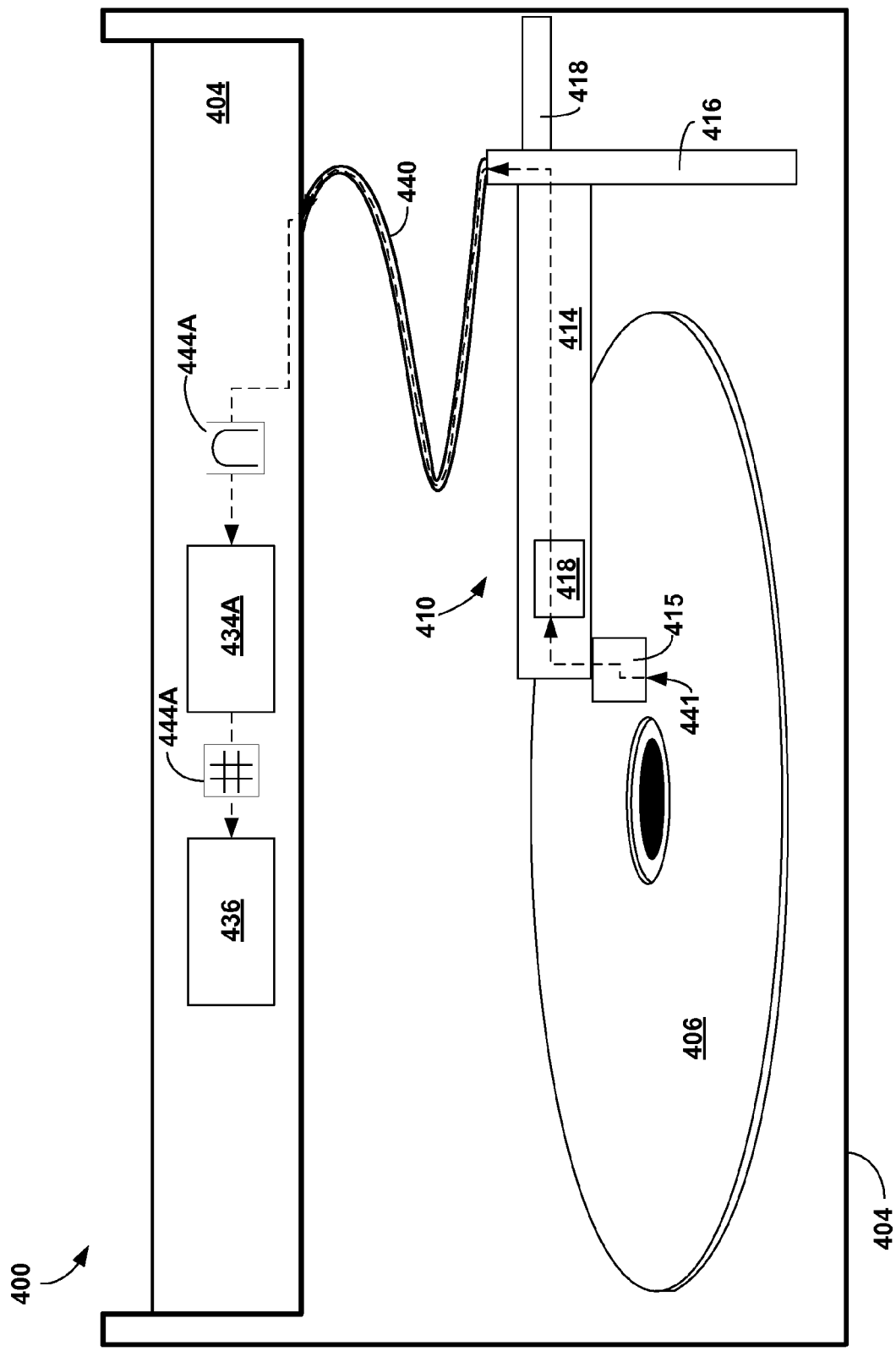
FIGS. 4A and 4B illustrate a disc drive assembly including an analog signal path before and after switching control circuitry for the disc drive assembly.
Figure 4B:
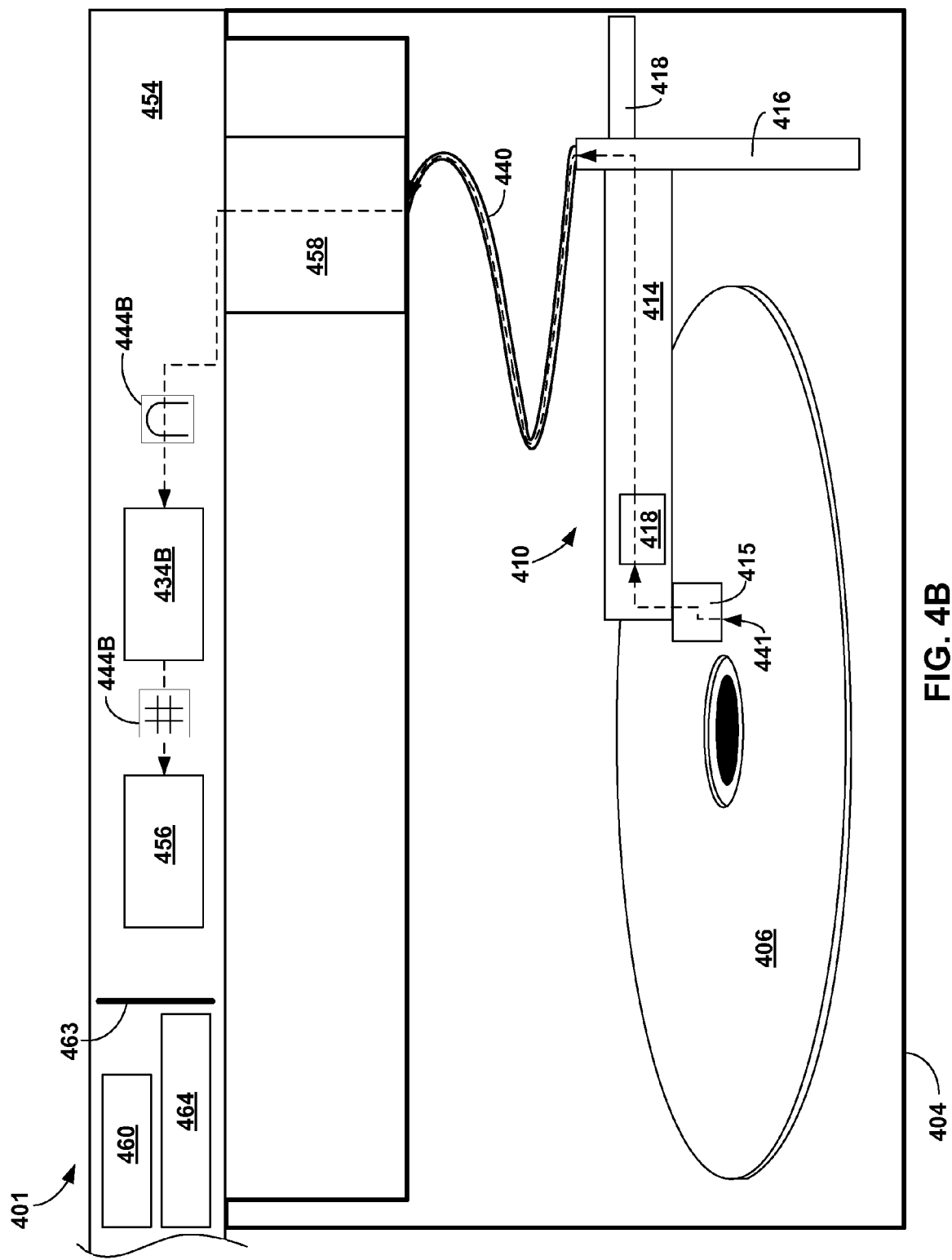

FIGS. 4A and 4B illustrate disc drive assemblies 400 and 401 respectively. Disc drive assemblies 400 and 401 share a common housing, housing 404. Disc drive assembly 401 differs from disc drive assembly 400 in that disc drive assembly 400 includes circuit board 404, while disc drive assembly 401 includes circuit board 454. For example, disc drive assembly 400 may be the same as disc drive assembly 306 in FIG. 3A; disc drive assembly 401 may be the same as disc drive assembly 308 in FIG. 3D. The techniques described with respect to FIGS. 3A-3D may be used to create disc drive assembly 401 by swapping circuit board 404 in disc drive assembly 400 with circuit board 454.

As shown in both FIG. 4A and FIG. 4B, housing 404 encases rotatable media disc 406. For example, media disc 406 may be a magnetic, optic, magneto-optic or other type of media disc. Actuator assembly 410 is also encased within housing 404. Actuator assembly 410 includes head 415, actuator arm 414, actuator bearing 416 and voice coil 418. Voice coil 418 actuates actuator arm 414 to position head 415 adjacent to different portions of media disc 406. Different embodiments may include actuation mechanisms different than actuator assembly 410.

Signals from head 415 traverse analog signal path 441 within housing 404. Analog signal path 441 includes head 415, preamp 418, actuator arm 414 and flex tape 440. In disc drive assembly 400, flex tape 440 connects to circuit board 404. Within circuit board 404, analog signal path 441 continues as analog signal path 444A. Analog signal path 444B travels through circuit board 404 to channel 434A, where analog signals from head 415 are converted to digital data signals. The digital data signals travel along digital signal path 444A to disc drive controller 436. Disc drive controller 436 controls the functions of disc drive assembly 400 including read and write operations and communications with a device in which disc drive assembly 400 is installed. Disc drive controller 436 may include a processing chip, firmware, software, memory, interfaces and/or additional components.

In comparison, in disc drive assembly 401, flex tape 440 connects to circuit board 454 via spacer 458. Within circuit board 454, analog signal path 441 continues as analog signal path 444B to channel 434B, where analog signals from head 415 are converted to digital data signals. The digital data signals travel along digital signal path 444B to controller 456. Controller 456 controls the functions of disc drive assembly 400 including read and write operations. Controller 456 also controls the functions of components 460 and 464, which give circuit board 454 additional functionality compared with circuit board 404. Controller 456 may include a processing chip, firmware, software, memory, interfaces and/or additional components.

For example, if disc drive assembly 401 is part of a DVR, components 460 and 464 may be video signal inputs/outputs, tuners or other video signal processing components. In FIG. 4B, components 460 and 464 are shown to demonstrate that circuit board 454 includes more components than circuit board 404. The actual function of the additional components on circuit board 454 relative to circuit board 404 will differ according to the end use of disc drive assembly 401.

Calibration of disc drive assembly 400 includes measuring analog signals at channel 434A. The analog signals traverse analog signal path 441 and analog signal path 444A between head 415 and channel 434A before being measured. Because analog signals are only measured at channel 434A, the effects of head 415, preamp 418, actuator arm 414, voice coil 418, flex tape 440, circuit board 404, channel 434A and other components of disc drive assembly 400 on an analog signal are incorporated into each calibration measurement. No measurements of the separate effect of any of these components are taken during calibration of disc drive assembly 400.

Overall, the design of circuit board 454 includes many features that allow calibration data created using assembly 400 to be applicable to the operation of assembly 401. As one example, analog signal path 444B is substantially similar to analog signal path 444A. For example, analog signal path 444B may be as close to the same as analog signal path 444A as possible. Even the radii of turns in analog signal path 444B may be the same as the radii in corresponding turns of analog signal path 444A.

One difference between analog signal path 444A and analog signal path 444B is that analog signal path 444B includes spacer 458. Spacer 458 includes low-resistance electrical interconnects. These electrical interconnects may be shielded to limit the effect of spacer 458 on analog signals traversing analog signal path 444B.

As another example of how circuit board 454 is similar to circuit board 404, channel 434A is substantially similar to channel 434B. For example, channel 434A may be the same part and made by the same manufacturer as channel 434B. The part and manufacturer used for channels 434A and 434B may be selected to have a minimal variance.

Circuit board 454 also includes shielding 463 to limit interference from components 460 and 464 from acting on signals traversing analog signal paths 441 and 444B. Shielding 463 is merely exemplary, the location and extent of shielding 463 varies in different embodiments of the invention. Embodiments of the invention may require shielding in multiple locations and surrounding multiple components of circuit board 454 to isolate noise and prevent interference with signals traversing analog signal paths 441 and 444B.

Through careful design of circuit board 454, calibration data gathered using disc drive assembly 400 may be applicable to disc drive assembly 401. During testing of an exemplary embodiment using techniques described herein, there was a slight increase in bit error rate with respect to assembly 401 compared to assembly 400. Testing showed almost no difference in the tracking of head 415 on media disk 406 with assembly 401 as compared to assembly 400.

FIGS. 5A-5C are top, front, and side views, respectively, that illustrate an example embodiment of a single board digital video system (hereinafter referred to as "video system 10"). Video system 10 includes circuit board 11, which may be used as replacement control circuitry for a calibrated disc drive assembly as previously described with respect to FIGS. 3A-3D, 4A and 4B. Circuit board 11 may be the same as circuit board 102 (FIG. 1) or circuit board 202 (FIG. 2). As such, circuit board 11 may prevent a user from accessing data content stored with data storage media 100 using circuit board different than circuit board 11.

FIGS. 5A-5C illustrate an example physical layout of component parts of video system 10 of the present invention on a single circuit board 11 as well as data storage media 100. For example, data storage media 100 may include a media disc, head and actuator assembly. Data storage media 100 is mounted to circuit board 11 via a mounting bracket 13 and several screws 17. External connectors 15 are external connection to tuners 23. Rubber grommets (not shown) between the mounting screws and mounting brackets provide shock and vibration absorption for video system 10.

Video system 10 includes a disc drive control circuitry 80 and associated disc drive memory 82, and power control circuit 84. A power connector 81 allows for connection to an external power source. A DVR controller 50 provides DVR control functionality and has an associated video memory 53 and flash memory 52. Tuners 23 provide for tuning of the incoming video signal and demodulators 24 separate the lower frequency digital content from the higher frequency carrier. Audio/video connectors 19 allow for input/output of various audio/video signals, such as composite video, s-video, component video, left/right audio or other audio/video signals. Data storage media 100 is mounted on the underside of circuit board 11.

Although a particular circuit board layout for video system 10 is shown and described with respect to FIGS. 5A-5C, it shall be understood that other circuit board layouts could also be used without departing from the scope of the present invention. The various circuit board components could be arranged on circuit board 11 in a variety of ways, and different components could be mounted either on the top or the bottom of circuit board 11 depending upon the particular layout chosen by the designer. However, the layout of circuit board 11 is selected to allow calibration data from a disc drive assembly that included data storage media 100 and a different circuit board other than circuit board 11 to be used in the operation of video system 10.

As shown in FIGS. 5A-5C, video system 10 is fabricated such that the electronic components of video system 10 are integrated onto a single circuit board 11. The physical connection for the interface over which DVR controller 50 and disc drive control circuitry 80 communicate is, therefore, composed of a circuit board trace. Fabrication of video system 10 using a single circuit board for all of the electronic components provides several advantages over conventional DVRs in which separately fabricated and individual circuit boards, each containing some fraction of the DVR components, are connected using various external connectors such as PATA or SATA ribbon cables and the like.

For example, all of the components for the video system 10 are incorporated into a single circuit board, reducing the number and complexity of components needed to implement the video system and, as a result, the total cost of the video system. Reducing the number of components also improves the overall reliability of the video system. Further, the compact architecture results in a smaller overall size and thickness of the resulting video system. Integrating the DVR module and the disc drive module into a single circuit board also reduces the need for communication between different circuit boards and delays associated with such inter-board communication. To phrase another way, video system 10 provides for communication of information between the DVR module and the storage control module without forwarding the information between multiple circuit boards.

As another example, placement of the electronics associated with both the DVR controller 50 and the disc drive control circuitry 80 on a single circuit board 11 allows video system 10 to take advantage of ground plane layer(s) located within the circuit board. The purpose of these ground plane layer(s) is to reduce grounding resistance and inductance as well as to provide a shield against EMI and RFI. Using a ground plane to connect all ground points on circuit board 11 helps to ensure that all circuit ground points are at the same potential. A ground plane also reduces the effect of radiated EMI on the performance of a circuit by reducing the electrical field strength in the vicinity of the ground plane. In this way, electrical noise, together with EMI and electrostatic discharge (ESD) performance, can be significantly improved by the use of a ground plane. This may significantly reduce or even eliminate the necessity of additional external shielding. In addition, the physical layout of the circuit board on which video system 10 is manufactured may be designed such that the circuit board traces are as short as possible, which further aids in minimizing EMI radiation.

To reduce the effects of DVR controller 50, video memory 53, flash memory 52, tuners 23, demodulators 24 and audio/video connectors 19 on the analog signal path from on analog signals from one or more heads within data storage media 100, one or more of the ground plane layers of circuit board 11 are partitioned. For example, ground plane partitions 92A and 92B are shown in FIG. 5A. Partitions 92A is separated from partition 92B by gap 91. Partitions 92A and 92B occupy a common layer within circuit board 11. Partition 92A provides grounding to components of circuit board 11 that are also included in a conventional disc drive assembly, including disc drive control circuitry 80. Partition 92B provides grounding to the other components of circuit board 11, including DVR controller 50, tuner 23 and demodulators 24. Partitions 92A is electrically coupled to partition 92B by low-pass filter 94. Low-pass filter 94 filters out high-frequency noise while providing a common ground potential for each of ground plane partitions 92A and 92B. Similarly, power supply trace 97, which supplies power to DVR controller 50 from power control circuit 84, includes low-pass filter 96 to filter out high-frequency noise. Low-pass filters 94 and 96 help ensure that calibration data for data storage media 100 created using a circuit board other than circuit board 11 is sufficiently accurate to allow operation of video system 10 without further calibration.

Integration of video system 10 on a single circuit board also allows the various components to share power supplies, memory buffers and other hardware components and eliminates unnecessary interconnects. For example, the various voltages supplied by voltage regulator 86 on storage control module 40 may be shared among the various system components. Power control circuit 84 generates, monitors and controls the power supplied to all of the components of video system 10, including DVR controller 50, disc drive control circuitry 80, tuners 23 and data storage media 100. Thus, fabrication of video system 10 on a single circuit board reduces redundant repetition of certain circuit board components leading to an associated reduction in size, cost and complexity of the resulting video system 10.

As a result, video system 10 is a complete, tested hardware and software solution that integrates the features of a disc drive with DVR control and video content reception functionality. By having the necessary hardware and software interfaces, it allows quick design and manufacture of customized DVR solutions that meet local geographic and market requirements. This may be of great advantage to DVR manufacturers, who would no longer need to go through the lengthy and costly design process required to combine the individual components into a workable DVR system.

Various embodiments of the invention have been described. However, various modifications may be made to the described embodiments within the spirit of the invention. For example, exemplary embodiments described techniques for preventing unauthorized access of content stored on a data storage device, wherein the data storage device was a disc drive including a media disc. However, embodiments of the invention may be a data storage device other than a disc drive and include different data storage media. For example, embodiments of the invention may include any computer-readable medium, such as a semiconductor memory, magnetic media, optical media, or the like. These and other embodiments are within the scope of the following claims.

The invention claimed is:

1. A device comprising:
  a data storage medium adapted to store data content encrypted using an encrypted key and the encrypted key, wherein the encrypted key is encrypted using a root key; and
  a removable control circuit including a first key,
  wherein if the first key does not correspond to the root key, the removable control circuit prevents access to the data content
  wherein the data storage medium is further adapted to store unencrypted data content, wherein the removable control circuit is further adapted to prevent access to the unencrypted data content if the first key does not correspond to the root key, and wherein at least a portion of the data content is unencrypted data content and wherein the removable control circuit is further adapted to delete the unencrypted data content if the first key does not correspond to the root key.

2. The device of claim 1, further comprising a digital signature having an unencrypted portion that indicates to the removable control circuit that a part of the data content is protected data content even if the first key does not correspond to the root key.

3. The device of claim 1, wherein the data content includes metadata.

4. The device of claim 1,
wherein the data storage medium is adapted to store calibration data,
wherein the removable control circuit is adapted to convert an analog signal read from the data storage medium into a digital data signal containing a portion of the data content using the calibration data.

5. The device of claim 1, wherein the removable control circuit is part of a circuit board.

6. The device of claim 5, wherein the circuit board includes:
a communication interface to forward the data content to a peripheral device;
a signal path that carries the data content to a communication interface;
a first plane, wherein the first plane is selected from a group consisting of a first ground plane and a first power plane; and
a second plane, wherein the second plane is selected from a group consisting of a second ground plane and a second power plane,
wherein the signal path is between the first plane and the second plane.

7. The device of claim 1,
wherein if the first key does not correspond to the root key, the removable control circuit deletes the encrypted key to permanently prevent access to the portion of the data content encrypted with the encrypted key.

8. The device of claim 1, wherein the removable control circuit includes a read only memory, wherein the first key is stored in the read only memory.

9. The device of claim 1, wherein the data storage medium is a magnetic medium.

10. The device of claim 1, wherein the data storage medium is a semiconductor memory.

11. The device of claim 1, wherein if the first key corresponds to the root key, the removable control circuit allows access to the data content.

12. A device comprising:
a data storage medium adapted to store an encrypted key and data content encrypted using the encrypted key, wherein the encrypted key is encrypted using a root key; and
a removable control circuit including a first key,
wherein if the first key corresponds to the root key, the removable control circuit allows access to the encrypted data content,
wherein if the first key does not correspond to the root key, the removable control circuit prevents access to the encrypted data content,
wherein the data storage medium is adapted to store an indication that the data content includes protected data content, and
wherein at least a portion of the data content is unencrypted data content and wherein the removable control circuit is further adapted to delete the unencrypted data content if the first key does not correspond to the root key.

13. The device of claim 12, wherein if the first key does not correspond to the root key, the removable control circuit refuses any request to access the protected data content.

14. The device of claim 12, wherein if the first key does not correspond to the root key, the control circuit erases the protected data content.

15. The device of claim 12, wherein the protected data content is not encrypted on the data storage medium.

16. The device of claim 12, wherein the protected data content includes the encrypted data content.

17. The device of claim 12, wherein the data storage medium is a magnetic medium.

18. The device of claim 12, wherein the data storage medium is a semiconductor memory.

19. A method comprising:
generating an encrypted key using a root key;
encrypting data content using the encrypted key;
storing the encrypted data content and the encrypted key on a storage medium;
if a key of a removable circuit corresponds to the root key, providing access to the encrypted data content;
if the key of the removable circuit does not correspond to the root key, preventing access to the encrypted data content; and
wherein at least a portion of the data content is unencrypted data content and wherein the removable control circuit is further adapted to delete the unencrypted data content if the key of the removable control circuit does not correspond to the root key.

20. The method of claim 19, wherein if the key of the removable circuit does not correspond to the root key, deleting any unencrypted data from the storage medium.

* * * * *